Figure 3:
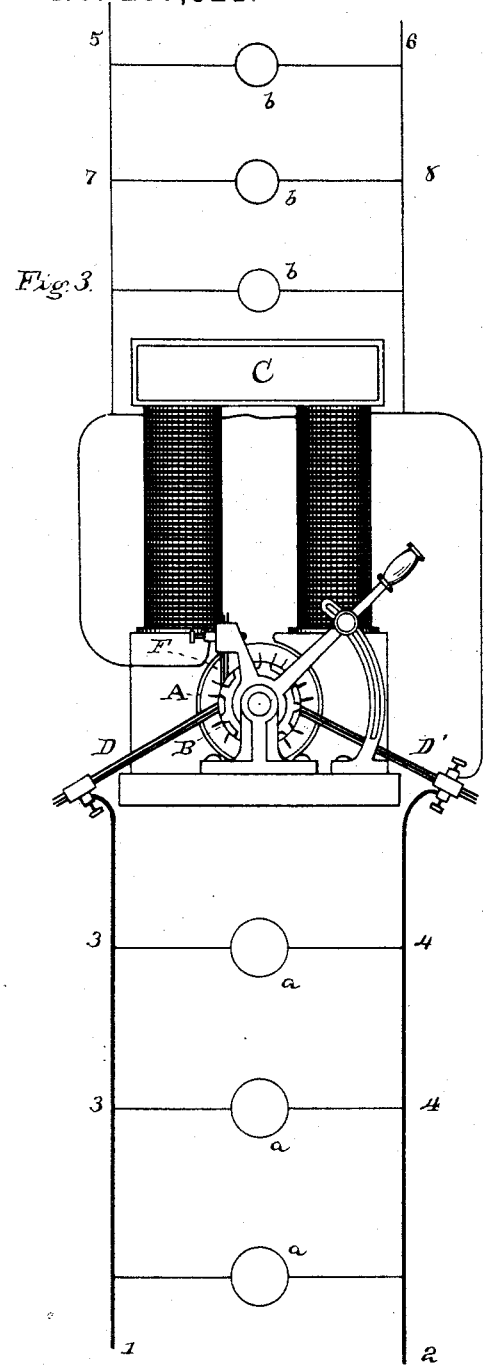

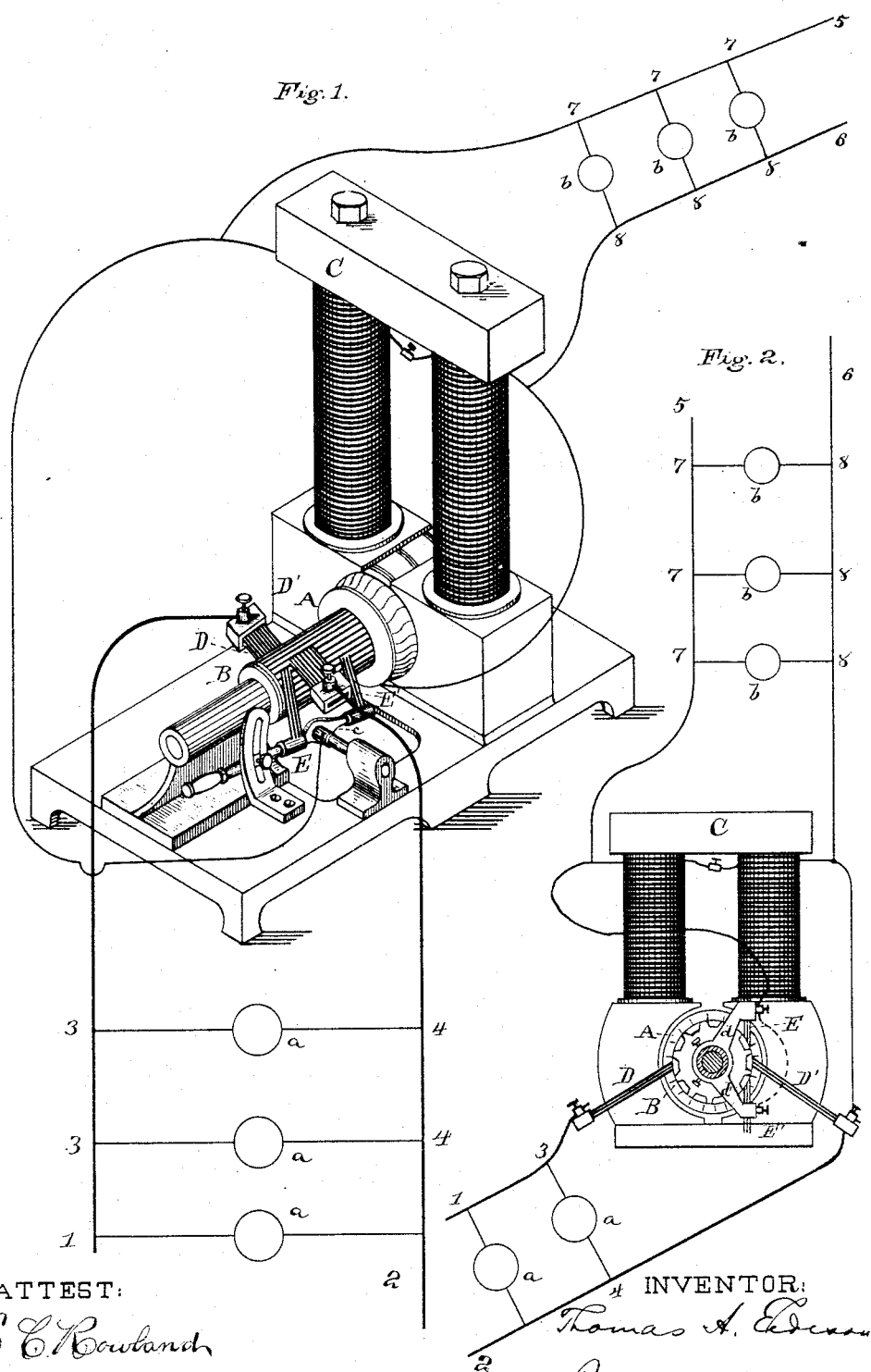

(No Model.) 2 Sheets—Sheet 2.

T. A. EDISON.
DYNAMO OR MAGNETO ELECTRIC MACHINE.

No. 287,521. Patented Oct. 30, 1883.

ATTEST:
E. C. Rowland
H. W. Seely

INVENTOR:
Thomas A. Edison,
By Rich'd N. Dyer,
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

DYNAMO OR MAGNETO ELECTRIC MACHINE.

SPECIFICATION forming part of Letters Patent No. 287,521, dated October 30, 1883.

Application filed March 16, 1883. (No model.) Patented in England August 5, 1882, No. 3,756, and in France October 24, 1882, No. 151,725.

*To all whom it may concern:*

Be it known that I, THOMAS A. EDISON, of Menlo Park, in the county of Middlesex and State of New Jersey, have invented a new and useful Improvement in Dynamo or Magneto Electric Machines, (Case No. 549,) of which the following is a specification.

The object I have in view is to produce a method and means for deriving from a dynamo or magneto electric machine two or more independent circuits in which there will be a different electro-motive force or pressure, such circuits being adapted for independent regulation. The extra circuit (or circuits) will have a lower electro-motive force than the main circuit, and is designed more especially for use in energizing the field-of-force magnet of the machine, or for operating translating devices, of which incandescing electric lamps form the best example, placed in multiple-arc circuits, and requiring a current of lower tension than the lamps or other translating devices in the main circuit; or this extra circuit may have both the magnet-coils and the lamps connected therewith in multiple arc. The object is accomplished by arranging to bear upon the commutator-cylinder, on each side of one of the main commutator-brushes, a secondary brush, which is mounted so as to be capable of adjustment toward or away from the main brush, independent of or together with its fellow on the other side of the main brush. These two secondary brushes are connected together electrically, and from them is led one part of the secondary circuit, the other part being connected with the main brush on that side of the commutator-cylinder. The farther apart the secondary brushes are placed on opposite sides of the main brush the greater will be the tension of the current in the extra circuit, and hence the tension can be readily regulated by varying the position of such brushes with reference to the main brush. The tension of the current in the main circuit can be independently regulated by shifting the main brushes, or in any other suitable well-known manner. The connection of the secondary brushes together electrically does not short-circuit any of the coils of the armature, since currents are generated in the same circumferential direction on both sides of the armature. It is evident that in this manner two extra circuits could be derived from the same machine, instead of one, a set of secondary brushes being arranged to form a circuit with each main commutator-brush. In that case it will be seen that the extra circuits themselves may be regulated independently of each other or together, and may have currents of the same or different tension. It will also be understood that one secondary brush, instead of two, could be used in connection with a main brush to form each extra circuit, which secondary brush would be mounted for adjustment to and from the main brush forming the other pole of the extra circuit, and in this manner almost any desired number of extra circuits could be derived from one machine, the tension of the current in each depending upon the distance of the secondary brush from the main brush with which it is connected. It is also evident that an extra circuit could be formed by placing two secondary brushes on opposite sides of the commutator-cylinder at points between the main brushes, the secondary brushes forming the poles for the extra circuit, and the tension of the current in the extra circuit being dependent upon the position of these brushes with relation to the line of neutralized generation.

It will be understood that the armature of the machine is of the Pacinotti or Siemens type, being provided with a continuously-wound bobbin connected at intervals with the parallel bars of a commutator, and also that the currents of different tension are derived from this continuous bobbin, all the brushes resting upon the single commutator-cylinder.

The foregoing will be better understood by reference to the drawings, in which—

Figure 1 is a view, partly diagrammatic, illustrating the invention, and showing the form first described, with the secondary brushes mounted for simultaneous adjustment; Fig. 2, a view of the same arrangement when the secondary brushes are independently adjustable, and Figs. 3 and 4 views of other arrangements for accomplishing the same object.

A is the armature, B the commutator-cylinder, and C the field-of-force magnet, of the machine.

D D' are the main commutator-brushes, which are mounted so as to be adjustable upon the commutator-cylinder. From these brushes run the main conductors 1 2, in multiple-arc or derived circuits 3 4, from which are the lamps or other translating devices $a$.

The secondary commutator-brushes E E', Figs. 1 and 2, bear on the commutator-cylinder on opposite sides of the main brush D'. From the secondary brushes E E' and the main brush D' runs the extra circuit 5 6. The coils of magnet C and lamps or other translating devices $b$ are in multiple-arc or derived circuits 7 8 from the conductors 5 6. These translating devices do not require a current of as high a tension as that required by the translating devices $a$.

In Fig. 1 the secondary brushes E E' are shown as carried by a pivoted arm, $c$, so that they can be adjusted simultaneously in opposite directions toward and away from the main brush D'. In Fig. 2 they are carried by separate and independently-adjustable arms $d\ d'$.

In Fig. 3 a single secondary brush, F, is shown as used to form one pole for the extra circuit 5 6, the other pole being formed by one of the main brushes.

Figure 4:
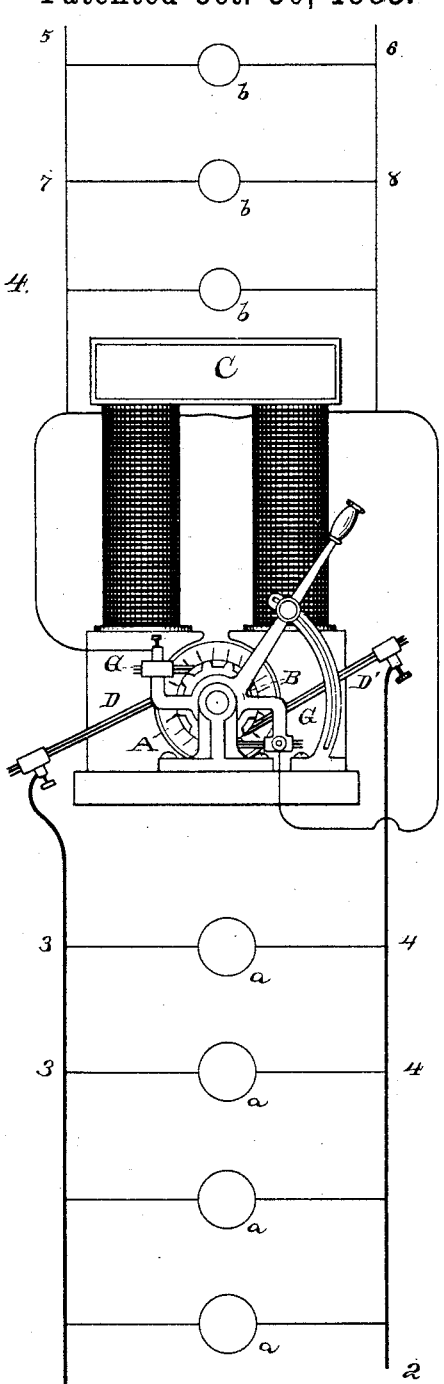

In Fig. 4 the secondary brushes G G are mounted to bear on opposite sides of the commutator-cylinder at points between the main brushes, and the conductors of the extra circuit are connected only with the secondary brushes.

I do not claim herein the broad idea of deriving two or more circuits of different tension from the same commutator connected with a continuously-wound bobbin, such circuits being independently regulated; neither do I claim herein the use of two or more auxiliary brushes adjustable independently of the main brushes, the circuit from said auxiliary brushes including the field-magnet coils of the machine, as these inventions form the subject of another application for Letters Patent, of which this is a division; but What I do claim is—

1. The combination, with a dynamo or magneto electric machine having a continuously-wound bobbin and a single commutator, of main commutator-brushes and one or more auxiliary brushes bearing on said commutator, circuits having currents of different tension connected with said brushes, and translating devices arranged in mutiple arc in each of said circuits, substantially as set forth.

2. The combination, with a dynamo or magneto electric machine having a continuously-wound bobbin and a single commutator, of main commutator-brushes and one or more auxiliary brushes bearing on said commutator, circuits having currents of different tension connected with said brushes, and incandescing electric lamps arranged in multiple arc in each of said circuits, substantially as set forth.

This specification signed and witnessed this 17th day of February, 1883.

THOS. A. EDISON.

Witnesses:
WM. H. MEADOWCROFT,
H. W. SEELY.